Dec. 16, 1958 D. M. MAKOW 2,864,956

STABILIZATION SYSTEM FOR TUNABLE OSCILLATOR WITH REFERENCE TO A PAIR OF STABLE OSCILLATORS

Filed Dec. 17, 1957 5 Sheets-Sheet 1

INVENTOR
DAVID MARK MAKOW
by R. J. Filipkowski

INVENTOR
DAVID MARK MAKOW
by R. J. Filipkowski

Dec. 16, 1958 D. M. MAKOW 2,864,956

STABILIZATION SYSTEM FOR TUNABLE OSCILLATOR WITH REFERENCE TO A PAIR OF STABLE OSCILLATORS

Filed Dec. 17, 1957 5 Sheets-Sheet 3

INVENTOR
DAVID MARK MAKOW
by R. J. Filipkowski
AGENT

Dec. 16, 1958 D. M. MAKOW 2,864,956

STABILIZATION SYSTEM FOR TUNABLE OSCILLATOR WITH REFERENCE TO A PAIR OF STABLE OSCILLATORS

Filed Dec. 17, 1957 5 Sheets-Sheet 4

INVENTOR
*DAVID MARK MAKOW* by R. J. Filipkowski
AGENT

STABILIZATION SYSTEM FOR TUNABLE OSCILLATOR
WITH REFERENCE TO A PAIR OF
STABLE OSCILLATORS

Filed Dec. 17, 1957

INVENTOR
*DAVID MARK MAKOW*
by R. J. Filipkowski
AGENT

United States Patent Office 2,864,956
Patented Dec. 16, 1958

2,864,956

STABILIZATION SYSTEM FOR TUNABLE OSCILLATOR WITH REFERENCE TO A PAIR OF STABLE OSCILLATORS

David Mark Makow, Ottawa, Ontario, Canada, assignor to National Research Council, Ottawa, Ontario, Canada, a body corporate of Canada Application December 17, 1957, Serial No. 703,327

15 Claims. (Cl. 250—36)

This invention relates to oscillation generators, and more particularly relates to generators of the variable frequency type which are capable of generating any one of a large number of precisely defined and highly stabilized frequencies within a given band. By the practice of the invention a variable frequency oscillator may be stabilized at any of a large number of frequencies within its total range of variation by reference jointly to a pair of precise fixed reference frequencies, the stabilized frequencies bearing predetermined relationships to each other and to the reference frequencies.

The invention has especial utility in providing oscillations of any one of a very large number of predetermined frequencies which are spaced by equal intervals within a given band of frequencies, for example channel frequencies, by employing a stabilization system requiring only two precise fixed reference frequency oscillators and without resort to frequency multiplication of the reference frequencies or of the variable frequency.

Due to the growth in recent years of radio communications of all types employing radio frequencies, the number of channels presently allocated, in the V. H. F. band for example, is becoming inadequate in some areas to satisfy the requirements of communications equipment handling speech, teleprinter or facsimile messages, remote indication signals, and telemetering signals, and of navigational aids and guides, to name but a few of the types. The maximum possible utilization of the band of frequencies lying between about 30 mc./s. and 300 mc./s. designated V. H. F., and of the still higher frequencies lying above this band, has heretofore been limited by inadequacy of existing apparatus to work with additional channels that might be accompanied by further subdividing a given block of frequencies. Heretofore in the frequency range from about 30 mc. to about 100 mc./second, a channel spacing of 100 kc./second has been dictated by the inability of practical transmitter and receiver equipments to reliably co-operate, for example, radio equipment employed in mobile services. Obviously if techniques and apparatus can be improved to permit reliable operation with a channel spacing which is a fraction of that hereofore required, a several fold gain in total number of channels would be had. In practice the available frequency bands in radio communications service are allocated to particular functions, and a block of frequencies in the band allotted to a user is then subdivided into discrete channels. The subdivision is determined mainly by the oscillator stabilities of transmitters, and to a lesser extent by the stabilities of variable local oscillators in superheterodyne receivers. Because the necessity for cooperatively using a receiver with a number of transmitting frequencies fixes the receiver bandwidth, the channel frequencies in a group are therefore generally allocated on the basis of constant frequency separation. A separation of adjacent channels by a multiple of the transmitted signal bandwidth is usually adopted to discriminate sufficiently against adjacent channels and to guard effectively against possible frequency deviations of the channel carriers.

Mobile equipments, and airborne V. H. F. equipment in particular, present difficult problems in achieving minimum bandwidth and reliable co-working on any one of a large number of channel frequencies. Conditions affecting oscillator stabilities in aircraft radio apparatus are extremely variable, and wide ranges of temperature change, humidity change, and pressure variations may be encompassed in a relatively short time. Heretofore the use of a stable frequency oscillator controlled by a quartz crystal for each channel has been a necessary but costly expedient. With the growth of use of V. H. F. channels, the sheer number of discrete stable frequencies to be provided has compelled their derivation from a limited number of precisely stabilized crystals having basic frequencies of a few megacycles per second or less, employing techniques of frequency multiplication and conversion, and impulse control. Many of these systems are complex, in that elaborate and expensive selection and rejection filters must be provided for choosing a wanted harmonic. Channel separation is inherently determined by the bandwidth required to contain the highest required operating frequency with the total variation due to multiplied error in stabilization of the reference crystal, together with necessary signal sidebands; hence such system is wasteful, and difficult to maintain. Such prior art systems are found to have spurious responses due to the large total frequency multiplication factors involved in obtaining the higher frequencies of a range from a lower frequency crystal controlled oscillator.

Other approaches to the problem have resorted to indirect reference to a chain of crystal oscillators by a variable oscillator tunable to a selected frequency with which intermediate reference oscillations are compared, the intermediate reference oscillations themselves being derived by selecting harmonics of an assortment of basic reference crystal oscillators.

In contrast to the relatively large investment of equipment and quartz crystals necessary for producing a large number of stabilized frequencies by prior art techniques, a greatly simplified and less costly equipment may be substituted, by adopting a stabilization scheme for a variable oscillator wherein the variable frequency is simultaneously compared with each of a pair of precise oscillation frequencies which may be controlled by a pair of crystals, or in the case where the higher reference frequency is twice the lower only a single crystal will suffice for obtaining the lower frequency directly and its second harmonic by doubling, the variable oscillator being stabilized to any one of a large number of frequencies which are rationally related to the pair of reference frequencies.

The generation of required stabilized frequencies in a band which may extend below and above the reference frequencies, is carried out by arranging that the wanted frequencies obtained in the variable oscillator are spaced from one of the reference frequencies by intervals which are integral submultiples of the difference between the reference frequencies, suitably mixing the wanted frequency with each of the reference frequency oscillations, and applying the so obtained outputs to a detector from whose output a low frequency beat control voltage is derived by a relatively low selectivity low-pass filter and is applied to a frequency control element in the variable oscillator. By choosing that the submultiples are for example in decade relation and by the use of a cascade arrangement of two or more stages of variable oscillators and associated mixer-detector elements, any one of a very large number of frequencies may be obtained having equal separations in a given band.

Essentially the invention consists in the generation by a variable frequency oscillator susceptible of stabilization by a low frequency alternating voltage, of oscillations of frequency spaced predetermined distances from each of two precisely stabilized basic reference frequencies which are separated by an interval to be divided and are the outputs respectively of a pair of fixed frequency oscillators, mixing the output of the variable frequency oscillator with the outputs of the two reference frequency oscillators by applying the outputs as inputs to a mixing device to generate modulation products including harmonically related series of difference frequencies which are submultiples or multiples of the interval, detecting the composite energy to produce a low beat frequency representing the deviation from an exact subdivisional frequency in the band or a multiple of such deviation frequency, and applying the low frequency beat to a frequency controlling device associated with the variable frequency oscillator, whereby to reduce the deviation to zero.

In a further expression of the invention a second variable frequency oscillator is stabilized to a rational frequency value of an interval determined by a second chosen pair of reference frequencies, in a similar manner. More specifically a second variable frequency oscillator is stabilized to an intermediate frequency which is spaced from one of the fixed reference frequencies by an integral submultiple of an intermediate interval whose limits are defined by the said reference and by the stabilized frequency of the first variable oscillator. Further variable frequency oscillators in succeeding stages may be stabilized with reference to a fixed frequency and a stabilized frequency of any preceding variable frequency oscillator stage or from a pair of two such derived stabilized reference frequencies, to produce further stabilized reference frequencies which occur at precisely predetermined subdivisional points of the interval defined between basic reference frequencies.

In carrying the invention into effect according to a first embodiment thereof, the output of a variable frequency oscillator which is to be stabilized to a predetermined frequency is fed as one input to a three-input mixing device, to the other two inputs of which are fed the respective outputs of the lower and the higher frequency reference oscillators, and the low-frequency output of the mixing device is then applied as a corrective control quantity to the control element of the variable frequency oscillator to stabilize the latter to a desired frequency which is rationally related to the reference frequencies.

In a second embodiment of the invention a control system may be realized for stabilizing a variable frequency oscillator with respect to a pair of stable fixed oscillation frequencies defining an interval, at predetermined frequencies which are spaced from one of the stable frequencies by submultiples of the interval, wherein the output of the variable frequency oscillator is mixed with the output of the lower of two reference frequency oscillators in a two-input mixer, and is also mixed with the output of the higher of the two reference frequency oscillators in a second two-input mixer, and the outputs of the mixers are themselves applied as inputs to a third mixer whose output is filtered to reject all modulation products lying above a relatively low frequency and is applied as the control quantity to correct the variable frequency oscillator when its output deviates from the desired frequency.

In simple illustration of the system, two reference oscillators $O_A$ and $O_B$ preferably crystal controlled, generate frequencies designated as 1000 and 1500 respectively, and a variable frequency oscillator $O_C$ may be set to any point within this band and also to frequencies in adjacent bands extending below 1000 and above 1500, for example between frequencies designated 700 and 1800. The variable frequency oscillator will be stabilized to a frequency which differs from either reference frequency by an exact submultiple $p/n$ of the difference (1500–1000), for example to the 1/10th points, hence it may be stabilized to the discrete values of the series 700, 750, 800, . . . extending to 1700, 1750, 1800, thereby providing 22 frequencies having equal separations by 50 and having stabilities of the same order as either crystal oscillator used for reference purposes. In addition, other fraction relationships may be adopted, not necessarily providing submultiples which are an exact number of cycles apart nor equally spaced, as for example where $n$ has the values 2, 3, 4, . . . $n$. Nor need the reference frequencies necessarily be related as common multiples of a given quantity. Any interval desired may be chosen between the reference frequencies, for example these may be chosen as 1000 and 1480, in which case the subdivision may be made on the basis of fractional parts evenly divisible into the interval, as $\frac{1}{2}$, $\frac{1}{3}$, $\frac{1}{4}$, $\frac{1}{5}$, $\frac{1}{6}$, $\frac{1}{8}$, $\frac{1}{10}$, $\frac{1}{12}$, $\frac{1}{15}$, $\frac{1}{16}$, $\frac{1}{20}$, and $\frac{1}{24}$, to provide discrete channel frequencies differing by the whole integer amounts 240, 160, 120, 96, 80, 60, 48, 40, 32, 30, 24, and 20 parts respectively, the choice of "$n$" being limited only by the efficiency of mixing reference and variable oscillations to produce pairs of difference oscillations and their harmonically related series which are multiples and submultiples of the interval from which an appropriate pair of harmonics may be selected to provide a beat frequency yielding deviation components. As will appear hereinafter, in one expression of the invention, the subdivision by the integer 10 of an interval determined by the reference frequencies as limits, requires the selection of the $(10-p)$th harmonic of the $$\frac{p}{10}$$

fraction of the interval, and selection of the $p$th harmonic of the $$\frac{10-p}{10}$$

fraction of the interval, where $p$ is the integer multiple of the $\frac{1}{10}$ fractional part of the band by which the variable frequency is spaced with respect to a reference frequency. Usually the values of "$n$" preferred will be 2, 3, 4, 5, 8, 10, or 20, the $\frac{1}{5}$th, $\frac{1}{10}$th and $\frac{1}{20}$th interval subdivisions being required to provide the constant frequency decade subdivisions preferred for communications channels. However, by cascading two or more stages, and by judiciously choosing both the values of $n$ and $p$ in each stage, it is possible to reliably stabilize to a very large number of frequencies.

As a specific illustration of a typical application of the inventive concept, where the separation interval of the basic crystal stabilized reference frequencies is 2 mc./second, discrete frequencies having 20 kc./second channel separations may be directly obtained over at least part of the interval and in an adjoining interval below the lower reference frequency, by employing two cascaded stages of variable oscillators according to the invention, wherein $n$ is chosen to be 10 for each and $p$ may have the value anywhere from 1 to 10 inclusive. The completeness of filling of all regularly spaced channel positions may be greatly improved by allowing $p$ to take values 11, 12, and higher.

By the use of three stages of variable oscillators with $n$ taken as 10 in each and $p$ allowed to exceed 10, a very large number of channels may be established, for example 10 kc./second spacings may be realized over a significantly large portion of the band, where the band interval of the reference frequencies is 10 mc./second wide, providing discrete frequencies appearing within the interval and also within adjoining lower and higher intervals totaling several thousand.

For a more complete understanding of the invention in its practice and modes of carrying it into effect, the following description is to be read in conjunction with the accompanying figures of drawing, wherein.

Figure 1:
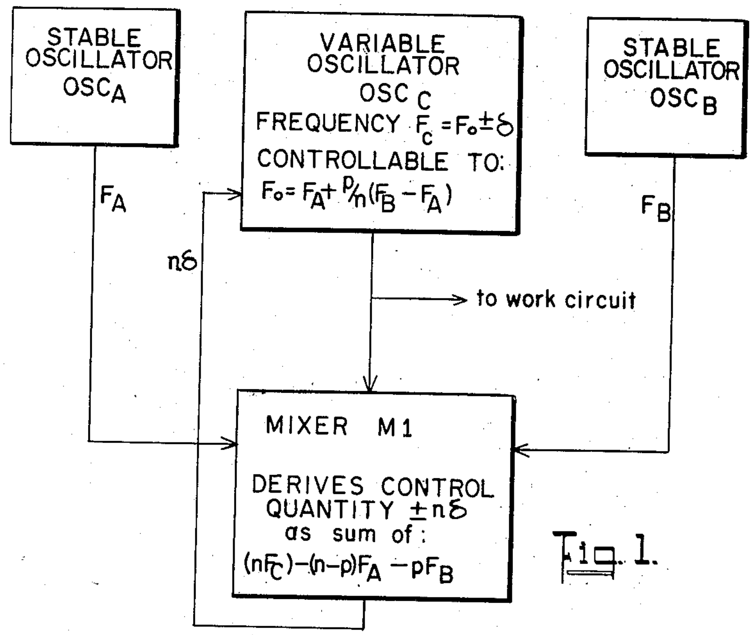
Fig. 1 is a functional block diagram showing a method of deriving low beat frequency stabilizing oscillations by comparing three oscillation frequencies whereof one is variable, employing a single mixer device.
Figure 6:
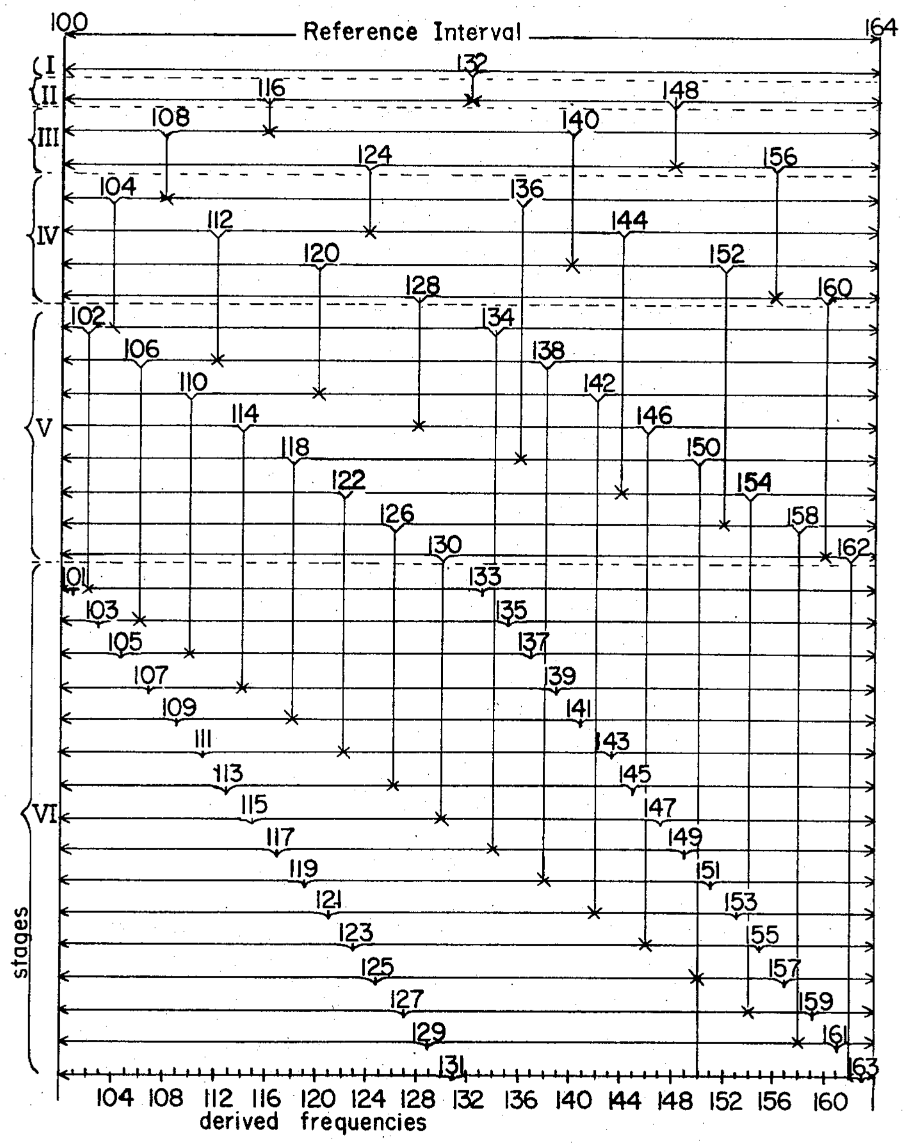
Figure 6A:
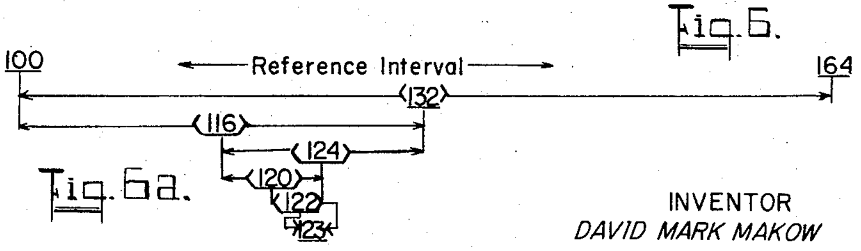
Figure 7:
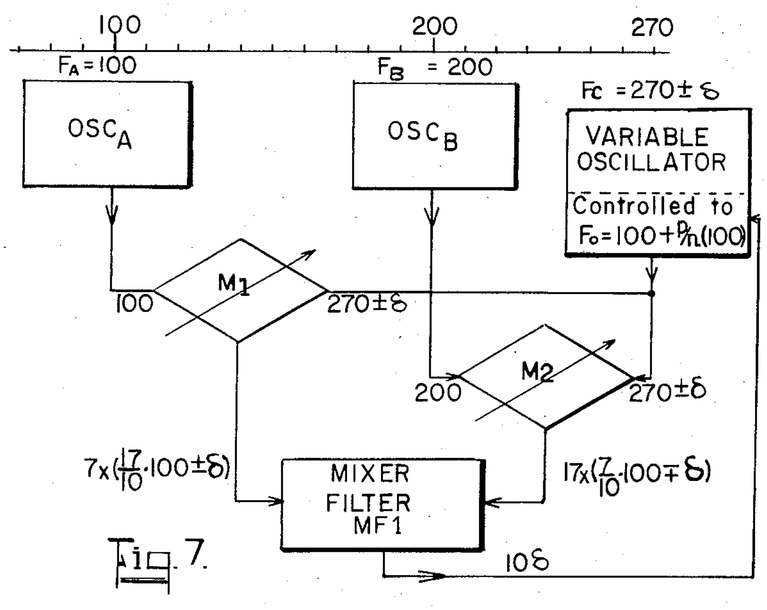
Figure 8:
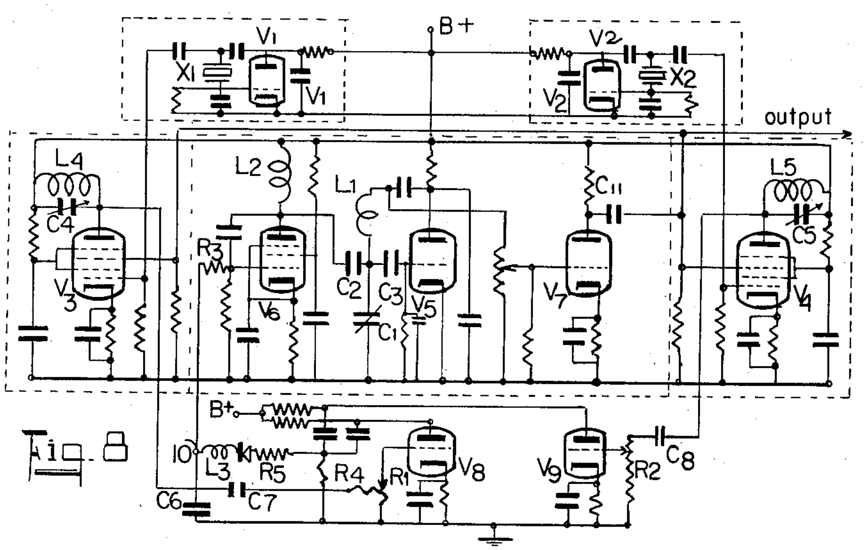

Figs. 6 and 6*a* show the manner of obtaining a number of stabilized frequencies by a plurality of stages of the system of Fig. 1 wherein stabilization is made to the mean frequency of an interval;

Fig. 7 is a diagram showing the application of the method of the invention to stabilizing a variable oscillator over a band which may extend below and above the interval defined by a pair of reference frequencies; and Fig. 8 is a schematic circuit diagram of a stabilization system for a variable oscillator which may be adjusted to a frequency spaced from a reference by an integral submultiple of an interval.

Referring to Fig. 1 of the drawings, each of the reference frequencies $F_A$ and $F_B$ as well as the variable oscillator frequency $F_C$ are simultaneously applied as inputs to a common mixer device M1. It will be understood that such device may include impedance means or other known devices for preventing direct interaction of one oscillator on another. It may be shown that stabilization to an integral submultpile of the band $(F_B-F_A)$ is possible when sufficiently high order modulation components of each of the inputs is present or is generated by the operation of the mixer unit. In this diagram the stabilization to the desired frequency $F_O$ of oscillator output $F_C$ of $OSC_C$ which differs from $F_O$ by the relationship $$F_C=F_O\pm\delta$$

is possible since $F_O$ is equal to:

$$F_O=F_A+\frac{p}{n}(F_B-F_A)$$

A very low frequency control quantity proportional directly to the deviation $\delta$ is derived according to the relationship:

$$(n\cdot F_C)-(n-p)\cdot F_A-(p\cdot F_B)=O \qquad (1)$$

The output therefore is $\pm n\delta$. It will be appreciated that when $n$ is 4 or less, the orders or the modulation components will be correspondingly low, and satisfactory energy levels of the required harmonics are readily realized in apparatus according to the invention.

The cascading of multiple stages of apparatus constructed according to the Fig. 1 system is described with reference to Fig. 2. The block diagram describes a pair of stages whereof the variable oscillator of the first stage is stabilized to the frequency $F_O$ having the value $$F_O=F_A+\frac{p}{n}\cdot(F_B-F_A) \qquad (2)$$

The mixer M2 of stage 2 is provided with a pair of selector single pole double throw switches S1 and S2, preferably mechanically ganged for respective selection of the pairs of frequencies $F_O$ and $F_B$ or $F_A$ and $F_O$. In the system the variable oscillator of the second stage has either a lower subinterval output $F'_O$ or a higher subinterval output $F''_O$. The output frequency is spaced from a lower reference frequency by the amount $$\frac{r}{q}\cdot(F_O-F_C)$$

or $$\frac{r}{q}\cdot(F_B-F_O)$$

the respective lower reference frequencies of the two intervals being $F_A$ and $F_O$.

It may be shown that the second stage variable oscillator is stabilizable to frequencies respectively defined as $$F_A+pq+rn-\frac{pr}{qn}\cdot(F_B-F_A)$$

and $$F_A+\frac{pr}{qn}\cdot(F_B-F_A)$$

Where additional stages are employed, each having a variable oscillator with a frequency controllable element, and a mixer detector unit fed from the variable oscillator and including selector means for accepting a chosen pair of reference oscillations, an extremely fine subdivision of a total interval $(F_B-F_A)$ may be attained by the use of a moderate number of stages. In illustration of the possibility of this cascaded system, a number of stabilizations available when $n$ is 2 in each stage is depicted in Fig. 6. Frequencies which can be obtained in a system comprising six stages in cascade employing the methods of Figs. 1 and 2 are shown in Fig. 6, wherein the horizontal extent or abscissa of the graph represents the frequency interval designated by the reference frequencies $F_A$ and $F_B$ which are given the values of 100 and 164. In the first stage the variable frequency oscillator is stabilized to the mean frequency of the band, namely 132. In stage II a second variable frequency oscillator is stabilized both either to the lower subinterval mean frequency of 116 or to the higher subinterval mean frequency of 148. Assuming that the value 116 is adopted in stage II, the oscillator in succeeding stage III would be set to either 108 or 140, assuming that one basic reference frequency is always used in the stabilization. Likewise if the stage II variable oscillator is set to 148, the oscillator in stage III would be stabilizable to either 124 or 156. It is believed to be obvious that each succeeding stage provides twice as many stabilization points in the band as were available in the preceding stage, and any one of the derived reference frequencies can be chosen for use with a following stage. Where as many as six stages are employed, the frequency 123 can be obtained by setting the first unit to 132, the second to 148, the third to 156, the fourth to 128, the fifth to 146 and finally the sixth to 123.

The total number of available frequencies $K_{(N)}$ is related to the number of stages N by $$K_{(N)}=2^N-1$$

Therefore 10 stages would permit the stabilization to any one of 1.023 frequencies, while 11 units would make available 2.047 discrete frequencies.

Whereas in the foregoing the variable oscillator of any stage was always referred to one basic reference frequency $F_A$ or $F_B$ and to a stabilized variable oscillator frequency, a further method of stabilization is possible wherein a desired frequency may be derived by employing as reference frequencies pairs of output frequencies from stabilized variable oscillators of preceding stages. Thus, for example, frequency 123 may be obtained as in Fig. 6*a* by setting the first variable oscillator at 132, the second to 116, the third to 124, the fourth to 120, the fifth to 122, and finally the sixth to 123. This system offers certain practical advantages, when the stabilization method of Fig. 3 is employed, in that the difference frequencies generated by the mixers will then be equal for all settings of the variable oscillator in a given stage.

A cascaded group of stages wherein $n$ is 3 and the interval $F_B-F_A$ is exactly divisible by 3, may be shown to produce a total number of discrete stabilization points within the interval as expressed by $$K_{(N)}=3^N-1$$

Figure 3:
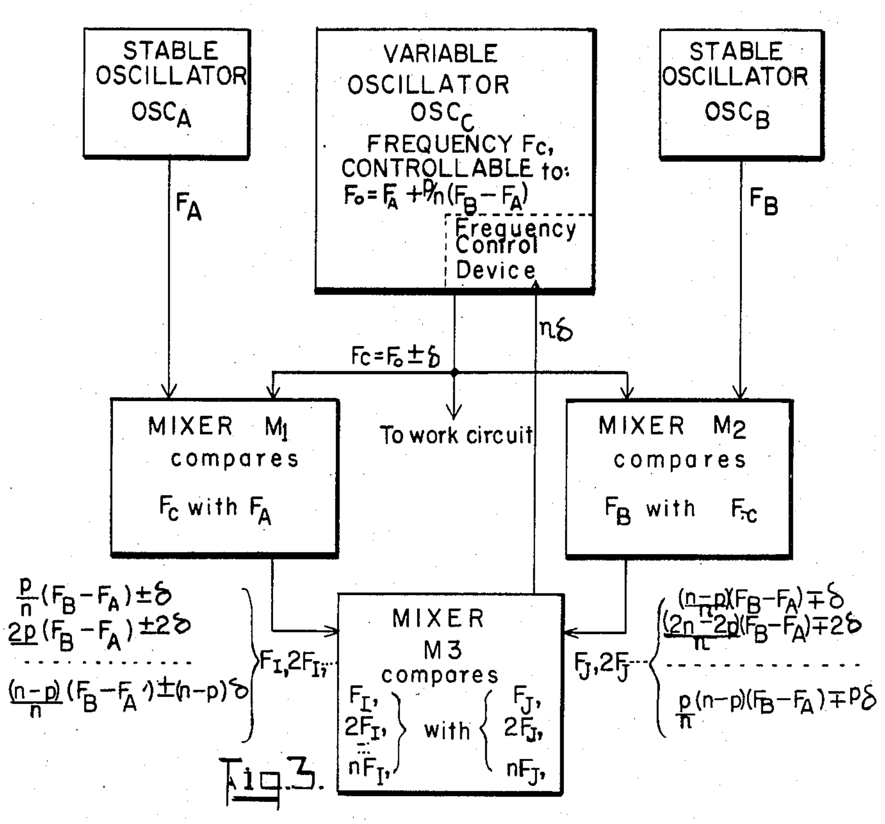
Fig. 3 is a functional block diagram showing another method of stabilizing a variable oscillator with respect to a pair of fixed frequency oscillators employing three mixers each having two inputs.

The schematic circuit diagram of Fig. 3 illustrates the handling of a pair of reference oscillations $F_A$ and $F_B$ and variable oscillations $F_C$, by employing three mixers each having two inputs, to stabilize $F_C$ to the frequency $F_O$, more specifically, $$F_C=F_O=F_A\pm\frac{p}{n}(F_B-F_A)$$

The stable oscillations of oscillator $OSC_A$ and the variable frequency oscillations of the apparatus $OSC_C$ are led to the mixer stage M1 where these undergo a subtractive comparison. It will be assumed for the purpose of illustration that the variable oscillation $F_C$ is subject to a deviation $\pm\delta$ from the desired subdivisional frequency $F_O$. By hypothesis, the chosen operating point for the variable oscillator $OSC_C$ lies above the lower reference $F_A$ by the amount $$\frac{p}{n}(F_B-F_A)$$

Accordingly, the output of a mixer device M1 includes the fundamental difference oscillation frequency $$\frac{p}{n}(F_B-F_A)\pm\delta$$

designated $F_I$, and higher modulation components including the frequency $$(n-p)\cdot\frac{p}{n}(F_B-F_A)\pm(n-p)\delta$$

Simultaneously, oscillations from the higher reference frequency stable oscillator $OSC_B$, at frequency $F_B$, are combined in the mixer stage M2 with the variable oscillations $F_C$, from which the frequency $$\frac{n-p}{n}(F_B-F_A)\pm\delta$$

and its higher modulation components are produced. These mixer output components are designed $2F_J$, $3F_J$, etc., up to $$\frac{p}{n}F_J$$

The total energy of each mixer is led to third mixer M3 wherein the series of harmonically related components of each of the first two mixers are compared. Generally speaking, one output component of mixer M1 will be substantially the same frequency as one of the components of mixer M2, with the deviation component or multiples thereof being present in each component. Subtraction of the two substantially identical frequency components yields the quantity $n\delta$. Where mixer M3 is inherently a low frequency output device, or where the output energy is filtered to exclude all higher order components, the output energy led to the frequency control device associated with variable oscillator $OSC_C$ will be substantially the $n$th multiple of the deviation frequency $\delta$. The multiple of the deviation quantity remains the same whatever the value of $F_O$ according to choice of $p$; where $n$ is changed, the output of mixer M3 accordingly will be restricted to energy having frequency components not higher than $n\delta$.

The frequency control device may be any suitable apparatus operatively associated with a variable oscillator and capable of being controlled by low frequency input energy to provide a corrective action upon the variable oscillator tending to reduce deviation quantity $\delta$. Suitable devices are known in the art, for example the heterodyne discriminator such as is described in an article "Frequency Control in Transmitters," by H. B. R. Boosman and E. H. Hugenholtz, Communication News, vol. 9(I) September 1947. Briefly, oscillator control apparatus according to such method includes a properly chosen reactance valve control for example, and the output of the mixer is required to be continuous in the vicinity of zero deviation. More specifically, when an input $n\delta$ to the control device produces the response in the variable oscillator bringing its frequency $F_O$ to the point at which $\delta$ becomes zero and reverses phase, the voltage on the regulating valve then is phase-responsive to the quantity $n\delta$. Examples of suitable zero beat frequency controlling circuits for oscillators are described in a U. S. Patent 2,274,434 to C. F. Shaeffer and in a Patent 2,288,025 to A. P. Pomeroy.

In a system according to Fig. 3, values of $F_O$ are limited only by the choice of $p$ and $n$, both of which are limited only by the efficiency of the mixers M1 and M2 in producing sufficient energy of the higher order modulation components of the fundamental comparison frequencies. For example where $n$ is 50 and $p$ is 43, mixer M1's output must include the component which is the 7th harmonic of the fundamental heterodyne frequency $F_I$; while mixer M2's output must include the 43rd harmonic of of the fundamental heterodyne frequency $F_J$. Obviously, the finer the subdivision according to increasing values of $n$, the more rigorous becomes the requirement for efficient mixing processes.

Figure 2:
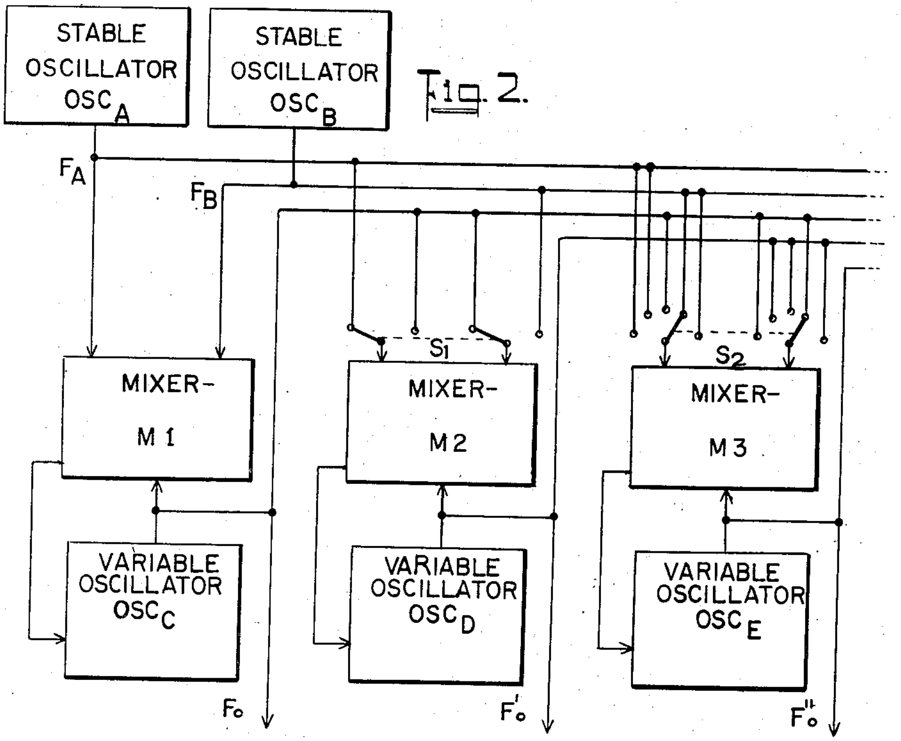
Fig. 2 is a functional block diagram showing a pair of stages as in the Fig. 1 diagram in cascade permitting stabilization to a range of submultiples of an interval.
Figure 4:
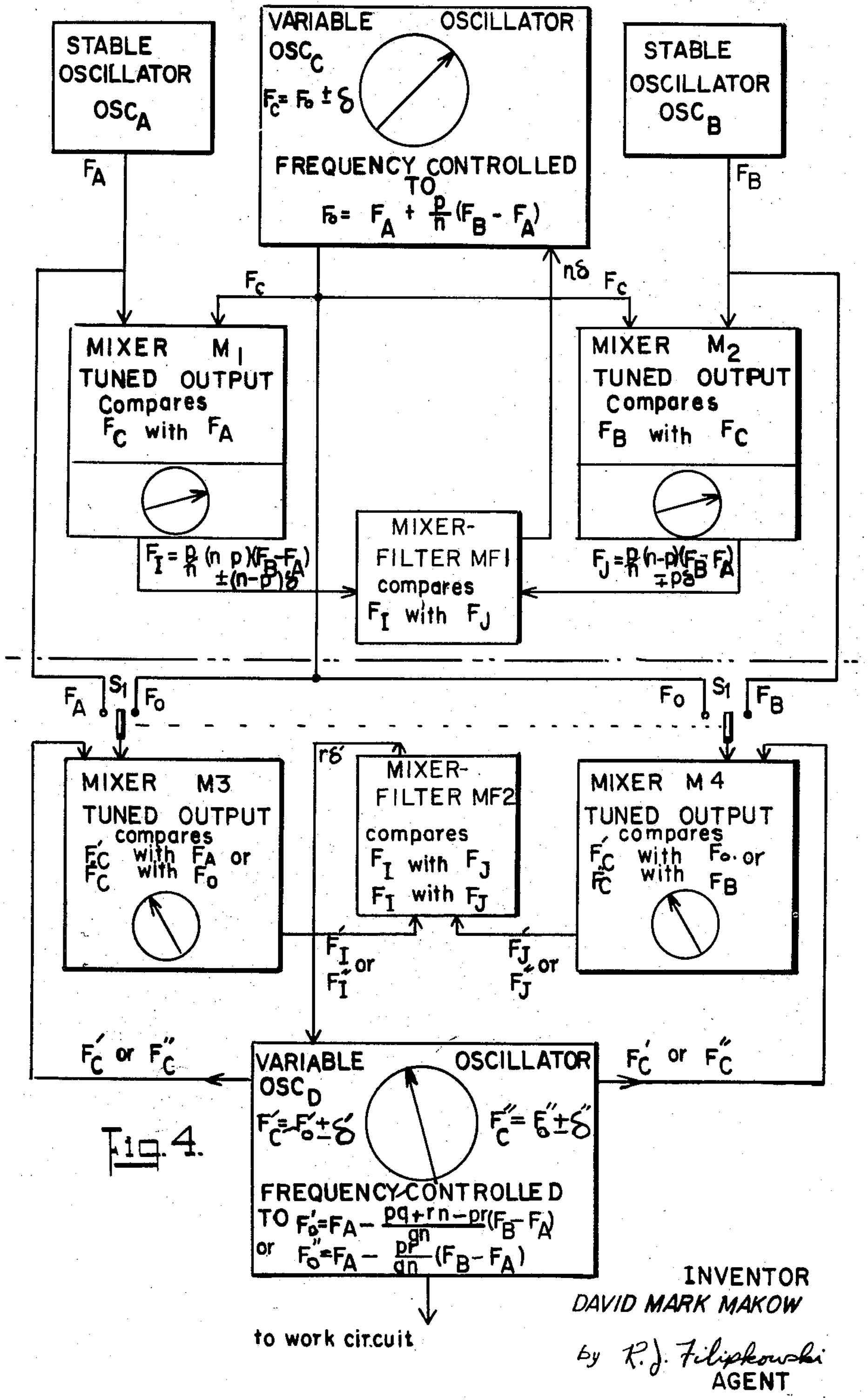
Fig. 4 shows a modification of the method of Fig. 3 employing two stages each combining pairs of frequencies by means of tuned mixers to produce selected difference oscillations and deriving a control quantity in each stage proportional to the error of the associated variable oscillator, to produce a finer subdivision of an interval.

The use of three mixers in place of one as described with Figs. 1 and 2 provides greater flexibility and affords the opportunity of selectively amplifying desired modulation products. The expression of Equation 1 remains valid, since it may be shown that in mixer M1, the modulation products compared are the $(n-p)$th harmonics of both $F_C$ and $F_A$, while those compared in mixer M2 are the $(p)$th harmonics of $F_B$ and $F_C$. It will be apparent that, as stated before, the over-all result may be shown to be the heterodyning of the $n$th harmonic of $F_C$, the $(n-p)$th harmonic of $F_A$, and the $(p)$th harmonic of $F_B$.

Where the variable oscillator frequency $F_O$ is required to be separated from the lower reference frequency $F_A$ by an interval which is a complex fraction of the difference $F_B-F_A$, and a large number of such settings are required, resort may be had to a cascade arrangement of a number of stages of stabilized variable oscillators, as indicated in Fig. 4. Each stage includes the same elements as described for Fig. 3. The output component of mixer M1:

$$F_I=\frac{p}{n}(n-p)(F_B-F_A)\pm(n-p)\delta \quad (3)$$

and the output component of mixer stage M2:

$$F_J=\frac{p}{n}(n-p)(F_B-F_A)\pm p\delta \quad (4)$$

yield in the mixer-filter MF1 a difference frequency beat $n\delta$ which is applied as controlling quantity to the variable oscillator $OSC_C$.

In stage 2 the frequency $F_C$, or more precisely the stabilized frequency $F_O$, is available as a reference frequency having a stability comparable with that of either $F_A$ or $F_B$. Switch S1 is provided at the input of mixer M3 to select either of the stable frequencies $F_A$ or $F_O$; switch S2 which is mechanically ganged with S1, provides a selection at the input of mixer M4 of either the frequency $F_O$ or the basic refrence frequency $F_B$. A second input of each mixer is fed with energy obtained from the variable oscillator $OSC_D$, being the variable oscillator of stage 2, whose range of variation is coextensive with that of oscillator $OSC_C$ of stage 1, and includes the subintervals between $F_A$ and $F_O$ and between $F_O$ and $F_B$. These intervals obviously may be unequal, depending upon the value of $F_O$.

If it is assumed that a frequency lying in the lower of the two subintervals is desired, namely $F_O'$, the variable oscillator $OSC_D$ is mechanically set to the nominal setting to yield this frequency. It will be assumed also for purposes of illustration that the actual output frequency is $F_C'$, which is equal to $$F_C'=F_O'\pm\delta' \qquad (5)$$

To stabilize the system, the inputs of mixers M3 and M4 are set by switches S1 and S2 to apply the respective reference frequencies $F_A$ and $F_O$. It will also be assumed that the interval $(F_O-F_A)$ is divisible by the integer number $q$, and that $F_O'$ lies above $F_A$ by the interval $$\frac{r}{q}=(F_O-F_A)$$

The output energy of mixer M3 contains the frequency $F_I'$ which may be defined as $$F_I'=(q-r)\cdot\frac{r}{q}(F_O-F_A)\pm(q-r)\delta' \qquad (6)$$

Similarly, the output of mixer stage M4, contains the frequency $F_J'$:

$$F_J'=(q-r)\cdot\frac{r}{q}\cdot(F_O-F_A)\pm q\delta' \qquad (7)$$

The mixer-filter device MF1 compares $F_I'$ with $F_J'$ to yield deviation frequency component $r\delta'$ applied to stabilize the variable oscillator.

It may be shown that the stabilized frequency of variable oscillator $OSC_D$ is equal to $$F_A+\frac{pq+rn-pr}{qn}(F_B-F_A)$$

When the desired frequency of the variable oscillator $OSC_D$ is above $F_O$ the switch positions of S1 and S2 are reversed, and the tunable output stages of mixers M3 and M4 are set to select the respective outputs $F_I''$ and $F_J''$. As has been described before, the output frequency of the variable oscillator will be supposed to be $F_C''$, equal to $$F_C''=F_O''\pm\delta''$$

The input of mixer M3 now consists of the derived reference frequency $F_O$ and the variable oscillator output $F_C''$. Accordingly the mixer output $F_I''$ contains $$(q-r)\cdot\frac{r}{q}\cdot(F-F)\pm(q-r)\delta''$$

The reference pair of frequencies applied to mixer M4 now comprise the upper basic reference frequency $F_B$ and the variable oscillator output $F_C''$. Accordingly the mixer output selected from mixer M4 is $$(q-r)\cdot\frac{r}{q}(F_B-F_O)\pm q\delta''$$

It will be apparent, as in the description with reference to the lower subinterval, mixer-filter unit MF2 compares $F_I''$ with $F_J''$ to derive the control frequency $r\delta''$. It may also be shown that the stabilized output of the variable oscillator $OSC_D$ will be:

$$F_O''=F_A+\frac{pr}{qn}\cdot(F_B-F_A) \qquad (8)$$

An examination of the numerical values of the derived stabilized frequencies $F_O'$ and $F_O''$ shows that when $p$, $q$, $r$, and $n$, are all positive, these derived frequencies lie above the lower reference frequency $F_A$, and that the first such stabilization point, when $p$ and $r$ are each unity, is spaced from $F_A$ by the quantity $$\frac{(F_B-F_A)}{qn}$$

Figure 5:
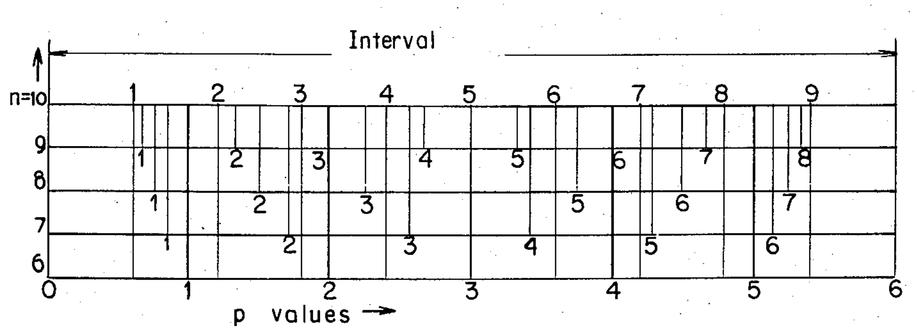
Fig. 5 illustrates a range of factors for an interval obtained with one stage by choosing "*n*" and "*p*" values from 1 to 10.

The scope of the stabilization system may be appraised by reference to Fig. 5, showing the available discrete subdivisional points of an interval at which simple integer fractions representing $$\frac{p}{n}$$

occur. A total of 31 discrete frequencies between the 1/10th and 9/10th positions of an interval may be obtained when $p$, and $q$, for a single stage have values 1 to 10 inclusive. It will be be appreciated that the compounding of stages, as for example the two stages shown in Fig. 4, with a similar choice of stabilization points for each stage, may yield a very large number of useful settings.

The stabilization of a variable oscillator $OSC_C$ to an interval at a frequency which lies outside of the interval between the basic reference frequencies $F_A$ and $F_B$ is described with reference to Fig. 7. In the drawing, which represents a simplified block circuit diagram, the fixed oscillator $OSC_A$ produces a reference frequency $F_A$ designated as 100, while the second fixed oscillator $OSC_B$ produces the stable frequency $F_B$ designated 200. In this instance the variable oscillator $OSC_C$ produces the frequency $F_C$ which is desired to be stabilized to 270, $F_C$ including a deviation $\pm\delta$ from the desired operating point.

In mixer M1 the frequencies 100 and 270 together with the deviation component are combined and the output of the mixer contains the 7th harmonic of the fundamental heterodyne frequency having the value $$7.(270-100)\pm 7\delta$$

Correspondingly, mixer M2 to which is applied the frequency 200 and the variable oscillator frequency of 270 with its deviation component, contains the 17th harmonic of the fundamental heterodyne frequency:

$$17.(270-200)\pm 17\delta$$

It will be apparent then that the detector filter compares the pair of inputs which are respectively:

$$1190\pm 7\delta$$

and $$1190\pm 17\delta$$

The control quantity therefor is obtained from the difference of the above and is derived as $10\delta$. It may likewise be shown that if the position of the variable oscillator $OSC_C$ is such as to generate a frequency lying below $F_A$, the operation and control will be substantially as has been described.

Examination of the output of the mixer shows that the order of the harmonic which yields the error component $\delta$ depends upon the factorial relationship of the frequency differences.

Where the value of $n$ is small, as for example 2, 3 or 4, or in other words where the variable oscillator is stabilized to the mid-point, to the ⅓ and ⅔ positions, or to the ¼, ½, and ¾ positions, the relative complexity of the frequency relationships is much reduced over that when employing large values of $n$. A very considerably simplified circuit will suffice in such cases, as has been described in Fig. 1.

A schematic circuit diagram of a laboratory type test oscillator produced according to the invention is described with reference to Fig. 8. In the embodiment, oscillators $OSC_A$ and $OSC_B$ are realized as crystal oscillators of conventional type, respectively employing the crystal devices X1 and X2 in the plate-grid circuits of triode oscillator tubes V1 and V2. The variable frequency oscillator $OSC_C$ comprises a tuned stage employing the tube V5 having its frequency determining elements L1, C1 in series between plate and cathode. A grid leak bias capacitor C3 is connected to the junction between L1 and C1, and to this junction is also connected a coupling capacitor C2 shunting the tank circuit by the anode-cathode impedance of the reactance tube V6. This tube and circuit is believed to be well understood in the art, and need not be elaborated here. Accordingly, control voltage applied by way of resistor R3 to control grid of V6 serves to modify the oscillator frequency.

The output of the oscillator stage is taken by way of a buffer stage including triode V7, to an output lead. The oscillator energy is fed also to the mixer grids of each of the tubes V3 and V4 in the respective mixers M1 and M2. Output energy of frequencies $F_A$ and $F_B$ is respectively fed to the control grids of the said mixer tubes. The output circuit of the mixer M1 includes a parallel-tuned plate load circuit comprising elements L4 and C4, and the mixer M2 includes corresponding tuning assembly L5–C5. The electron flow in the space discharge paths of each of the mixer tubes is modulated according to the oscillations impressed on the respective control and mixer grids, to produce superheterodyne mixing action, whereby selected output frequencies will generally be simple multiples of the fundamental heterodyne difference frequency. It should be noted that the output frequencies of the respective mixers are substantially identical when their tuning elements are correctly set, and differ only by certain multiples of a deviation component as long as oscillator $OSC_C$ remains not fully corrected. The mixer outputs are coupled to respective buffer stages including tubes V8 and V9, by way of coupling capacitors C7 and C8 respectively coupled to the grid resistors R1 and R2 of the stages. These are simple aperiodic amplifier stages, having resistance plate circuit loads, and having their plates respectively coupled by the coupling capacitors C10 and C9 to a common output load resistor R4. At this point all of the mixer output frequency components appear, somewhat amplified, and are applied to a detector-filter network comprising the resistor R5, the diode D1, and the inductance L3 in series therewith, together with a filter capacitor C6. By a suitable choice of the resistance, inductance, and capacity values, the potential of the point 30 can be shown to be D. C. having a very low frequency modulation component, the latter being a multiple of the deviation frequency of oscillator $OSC_C$. The output potential is applied by way of resistor R3 to the control grid of reactance valve V6, with the polarity so arranged as to provide a corrective action tending to decrease the deviation quantity $\delta$. Such a discriminator is capable of distinguishing the positive values of $\delta$ in the detector output from the negative values. As corrective alternating voltage is applied to the control grid of V6, the oscillator frequency is shifted over past the zero-deviation point, with a change of phase resulting in the error quantity whereby a stable control point is established.

It is obvious that the combination of variable frequency oscillations with a pair of fixed stable oscillations simultaneously may be accomplished by apparatus differing from the embodiments specifically described herein, without departing from the scope of the invention as defined in the appended claims.

I claim:

1. A stabilization system for a variable frequency oscillator having an automatic frequency control element, comprising first and second stable oscillators of fixed reference frequencies spaced apart to define an interval, energy combining means for combining the output energies of said oscillators and effective to generate output oscillations including components derived by differences of integer multiples of said input frequencies, selector means for extracting low frequency component control oscillations from said output oscillations, and means applying said control oscillations to said frequency control element whereby to reduce said control oscillations toward zero by controlling said variable frequency oscillator to a frequency of stabilization which differs from a reference frequency by an integer submultiple of said interval.

2. A system as in claim 1 wherein said combining means comprise a common mixing stage having energies of said variable and said fixed frequency oscillators applied as inputs and including low pass filter means for rejecting all output oscillation components whose frequencies exceed a predetermined multiple of the difference between the oscillation frequency of said variable oscillator and a frequency of stabilization.

3. A stabilization system as in claim 1 wherein said combining means comprise three mixing stages each having two inputs, the first and second stages respectively combining the energies of the variable frequency oscillator with the energies of the first and of the second fixed frequency oscillators to produce respective intermediate output oscillations, and the third mixing stage combining the said intermediate output oscillations as inputs to produce said output oscillations.

4. A stabilization system as in claim 3 wherein said first and said second mixing stages include tuned circuits selective to deliver outputs which are identical integer multiples of integer submultiples of said interval, and said third stage includes low pass filter means in its output for passing only output oscillation components whose frequencies are lower than a predetermined multiple of the difference between the oscillation frequency of said variable oscillator and a frequency of stabilization.

5. A stabilization system as in claim 1 wherein the fixed reference frequencies are themselves stabilized as the outputs of variable frequency oscillators by reference to a pair of stable oscillators.

6. A stabilization system as in claim 1 wherein said frequency of stabilization differs from a stable reference frequency $F_A$ of the pair of fixed frequencies $F_A$ and $F_B$ according to the relation:

$$F_O = F_A \pm \frac{p}{n}(F_B - F_A)$$

wherein $F_O$ is a frequency of stabilization, and $p$ and $n$ are integers, and $p$ is chosen as a value lying in the range $\pm p = 1$ to $\pm p > n$.

7. A generator for generating first oscillations of a first frequency which is continuously variable over a band between predetermined limits and subject to frequency deviation, a pair of oscillation generating means for producing a pair of precisely stabilized reference oscillation frequencies spaced by an interval, at least one of the reference oscillation frequencies lying in the band, first mixer means for comparing the first oscillations with the lower reference frequency oscillations to produce a first series of difference oscillations of frequencies which are proportional to an integer fraction of the interval, second mixer means for combining said first oscillations with the higher reference frequency oscillations to produce a second series of difference oscillations of frequencies which are proportional to an integer fraction of the interval, a third mixer means having said first and said second difference oscillations applied as inputs, a low pass filter, means applying the output of said third mixer to said low pass filter whereby to pass only oscillations which are simple multiples of said frequency deviation, to the output of the filter, frequency control mean associated with said generator, and means applying the filter output to said control means in such sense as to reduce the said frequency deviation.

8. The combination of claim 7 wherein both reference frequencies occur in said band.

9. The combination of claim 7 wherein said first oscillations are stabilized to a frequency spaced from one of the reference oscillation frequencies by an integral submultiple $p/n$ of the interval, and said first and said second difference oscillation frequencies are proportional to the interval respectively by the factors $p/n$ and $(n-P)/n$, where $n$ and $p$ are integers, and $p$ is chosen in the range $\pm p = 1$ to $\pm p > n$.

10. The combination of claim 9 wherein said mixer means are tunable jointly to select a common multiple of the difference oscillations having the value:

$$(n-p)(p/n)(F_B - F_A)$$

where $F_B$ and $F_A$ are the reference oscillation frequencies.

11. A first oscillation generator of variable frequency oscillations which is continuously variable over a band and subject to a frequency error, second and third oscillation generators of respective second and third fixed stable frequency oscillations defining an interval which is co-extensive with at least a portion of said band, first mixer means combining the variable oscillations and the second oscillations to produce first output oscillations of a frequency proportional to the interval and including an error quantity, second mixer means combining the variable and the third oscillation frequencies to produce second output oscillations proportional to the interval and including an error quantity, means applying said output oscillations jointly as input to third mixer means, low pass filter means having a cutoff lower than a predetermined multiple of the frequency error, means applying the output of the third mixer to said filter, a frequency control device for controlling said first generator and responsive to low frequency control energy, and means applying output energy from said filter to said device for reducing said frequency error.

12. The combination of claim 11 wherein said first and second mixer means are tunable and select the output frequency $$(n-p)(p/n)(F_B-F_A)$$

where $n$ and $p$ are integers and $p$ is selected from the series $p=\pm 1$ to $p>\pm n$ and said first oscillation generator is tuned and stabilized to a frequency which differs from the frequency of the lower stable oscillations by the $p/n$ submultiple of the interval $(F_B-F_A)$, wherein $F_B$ and $F_A$ are said third and said second oscillation frequencies.

13. In combination, a first generator of oscillations of lower fixed frequency $F_A$, a second generator of oscillations of higher fixed frequency $F_B$, a third generator of oscillations of frequency $F_C$ which is continuously variable over a range at least including $F_A$ or $F_B$, means stabilizing said third generator of oscillations to a frequency $F_O$ which differs from $F_C$ by an error quantity $\delta$, according to the relation:

$$F_C=F_A\pm\frac{p}{n}(F_B-F_A)\pm\delta$$
$$=F_O\pm\delta$$

wherein $n$ and $p$ are integers and $p$ may exceed $n$ and is chosen either positive or negative from the series $\pm p=1, 2, 3, \ldots n \ldots p$, comprising first energy combining means for combining $F_C$ and $F_A$ to produce first difference oscillations proportional to the first frequency $$\frac{p}{n}(F_B-F_A)\pm\delta$$

second combining means for combining the frequencies $F_B$ and $F_C$ to produce second difference oscillations proportional to the second frequency $$(n-p)(1/n)(F_B-F_A)\pm\delta$$

said variable frequency generator having a frequency controlling element, third combining means for combining said first and said second difference oscillations and for extracting a low beat frequency component proportional to $\delta$, as control for the frequency controlling element whereby to reduce said error quantity toward zero.

14. The combination of claim 13 wherein said third combining means compare multiples of said difference oscillations have the respective values $$(n-p)(p/n)(F_B-F_A)\pm(n-p)\delta$$

and $$(n-p)(p/n)(F_B-F_A)\pm p\delta$$

whereby to produce the low beat frequency component $n\delta$.

15. The combination of claim 13 wherein said first and said second combining means include output selecting means tunable to select the $(n-p)$th multiple of said first frequency and the $(p)$th multiple of said second frequency.

No references cited.